(12) United States Patent
Morrow

(10) Patent No.: US 7,269,572 B2
(45) Date of Patent: Sep. 11, 2007

(54) SYSTEM, METHOD, AND ARCHITECTURE FOR IMPLEMENTING A BUSINESS IFINITI ON AN INFORMATION NETWORK

(76) Inventor: Larry Morrow, 18407 Tettenhall Dr., Dallas, TX (US) 75252

( * ) Notice: Subject to any disclaimer, the term of this patent is extended or adjusted under 35 U.S.C. 154(b) by 390 days.

(21) Appl. No.: 10/006,595

(22) Filed: Dec. 5, 2001

(65) Prior Publication Data

US 2003/0130896 A1    Jul. 10, 2003

Related U.S. Application Data

(60) Provisional application No. 60/260,822, filed on Jan. 10, 2001, provisional application No. 60/251,453, filed on Dec. 5, 2000.

(51) Int. Cl.
*G06Q 30/00* (2006.01)
(52) U.S. Cl. ....................................................... 705/26
(58) Field of Classification Search .................. 705/26, 705/27, 14
See application file for complete search history.

(56) References Cited

U.S. PATENT DOCUMENTS

| | | | |
|---|---|---|---|
| 6,144,948 A * | 11/2000 | Walker et al. ................. | 705/38 |
| 2001/0048737 A1 * | 12/2001 | Goldberg et al. ...... | 379/114.13 |
| 2002/0007334 A1 * | 1/2002 | Dicks et al. ................... | 705/37 |
| 2002/0052784 A1 * | 5/2002 | Sherwin et al. ............... | 705/14 |
| 2002/0116282 A1 * | 8/2002 | Martin et al. .................. | 705/26 |
| 2002/0120519 A1 * | 8/2002 | Martin et al. .................. | 705/21 |
| 2003/0046147 A1 * | 3/2003 | Bondy .......................... | 705/14 |

\* cited by examiner

*Primary Examiner*—Ronald Laneau
(74) *Attorney, Agent, or Firm*—Jackson Walker LLP; Robert C. Klinger

(57) ABSTRACT

The invention is a business system that incorporates Affinity organizations and secondary affinity organizations to secure subscribers as buyers for affiliate organization products. In one embodiment, purchases are made through a customizable purchasing platform that, when visited by a subscriber, appears to be a web site administered by the subscriber's partner.

18 Claims, 4 Drawing Sheets

SYSTEM, METHOD, AND ARCHITECTURE FOR IMPLEMENTING A BUSINESS IFINITI ON AN INFORMATION NETWORK

RELATED APPLICATIONS

The invention is related to and claims priority from U.S. Provisional Patent Application No. 60/251,453 filed on Dec. 5, 2000, and to U.S. Provisional Patent Application No. 60/260/822 filed on Jan. 10, 2001, both of which are incorporated by reference herein in their entirety.

BACKGROUND

1. Technical Field of the Invention

The invention relates generally to business methods and information networks, such as the internet or wireless internet, and more particularly, the invention relates to systems, methods and architectures for implementing a business on the information network.

2. Prior Art

Most organizations, particularly non-profit organizations, receive funds from supporters in the form of donations, from members in the form of dues, or through general fundraisers. Thus, the preponderance of income to these organizations is obtained through proactive efforts, and these are sometimes only marginally successful. Furthermore, any success with fund generation is often negatively effected by marketing expenses and administrative overhead.

Some organizations have been able to generate additional funds by leveraging participation with service providers that generate predictable, periodic, residual income, such as long distance providers, internet providers, and insurance companies. However, these sources of residual income are not without cost. Recruiting them, designing a program to use with them, and actually using them requires substantial activity, such as active participation, negotiation, accounting, and marketing. Because of these costs, many organizations choose not to pursue a relationship with potential residual income partners, often deeming such relationships "too much trouble" or "not worth the effort."

Presently, there is not a program that provides income or value similar to that generated by the invention (also called the Ifiniti business system) to primary partners (also called Affinity Partners) and secondary partners. Accordingly, the invention provides a unique business system for marketing, promotion, and revenue generation.

SUMMARY

The invention provides technical advantages as a business system that supplies several unique features. The business system generally includes an affiliate organization that provides a good or a service, and a partner called an Affinity organization that has a plurality of members. A member may purchase a good or service provided by an affiliate organization preferably through a single web site, the Ifiniti web site, which is configured so that when a member accesses the Ifiniti web site (perhaps from a direct link from an Affinity organization's own web page), the Ifiniti web site appears to be a web site administered by the partner.

The Ifiniti business system utilizes the power of Affinity organizations and the loyalty and support of secondary partners, and their supporters, fans, and members to generate substantial income from already loyal customer bases. Preferably, participation with Ifiniti by the Affinity partners will be passive, which means that there will not be a need to enter negotiations with other partners, or a need to deal with single providers. Furthermore, Affinity organizations will not need to keep accounting records or hassle with administration. Another feature of the invention is that it creates value for the Affinity partner organization through equity sharing.

Some Affinity organizations may participate with other "unlinked" product and service providers to generate income for Affinity organizations, exclusively. In addition, internet technology and proprietary software applications allow Ifiniti to link together affiliate providers and Affinity partners to allow consistent application of the Ifiniti business system. Another feature of the invention is the ability to make and fulfill orders through a variety of communication means, such as information networks, wire or wireless internet, Personal Digital Assistants, telephones, smart cards (such as American Express's™ smart card program), or cell phones, for example. Simultaneous with purchasing, the tracking and accounting operations are provided—this enables, in part, residual income to be paid accurately to primary and secondary partners.

One of the features of the Ifiniti Business System is tapping the power of the Affinity relationship between the Affinity organization and its supporters. Enabling those same supporters savings on all purchases while passing along residual income to their Affinity organizations and in turn their secondary partners.

Of course, other features and embodiments of the invention will be apparent to those of ordinary skill in the art. After reading the specification, and the detailed description of the exemplary embodiment, these persons will recognize that similar results can be achieved in not dissimilar ways. Accordingly, the detailed description is provided as an example of the best mode of the invention, and it should be understood that the invention is not limited by the detailed description. Thus, the invention is read as being limited only by the claims.

BRIEF DESCRIPTION OF DRAWINGS

Various aspects of the invention, as well as an embodiment, are better understood by reference to the following DETAILED DESCRIPTION. To better understand the invention, the DETAILED DESCRIPTION should be read in conjunction with the drawings in which.

DETAILED DESCRIPTION

Introduction

Figure 1:
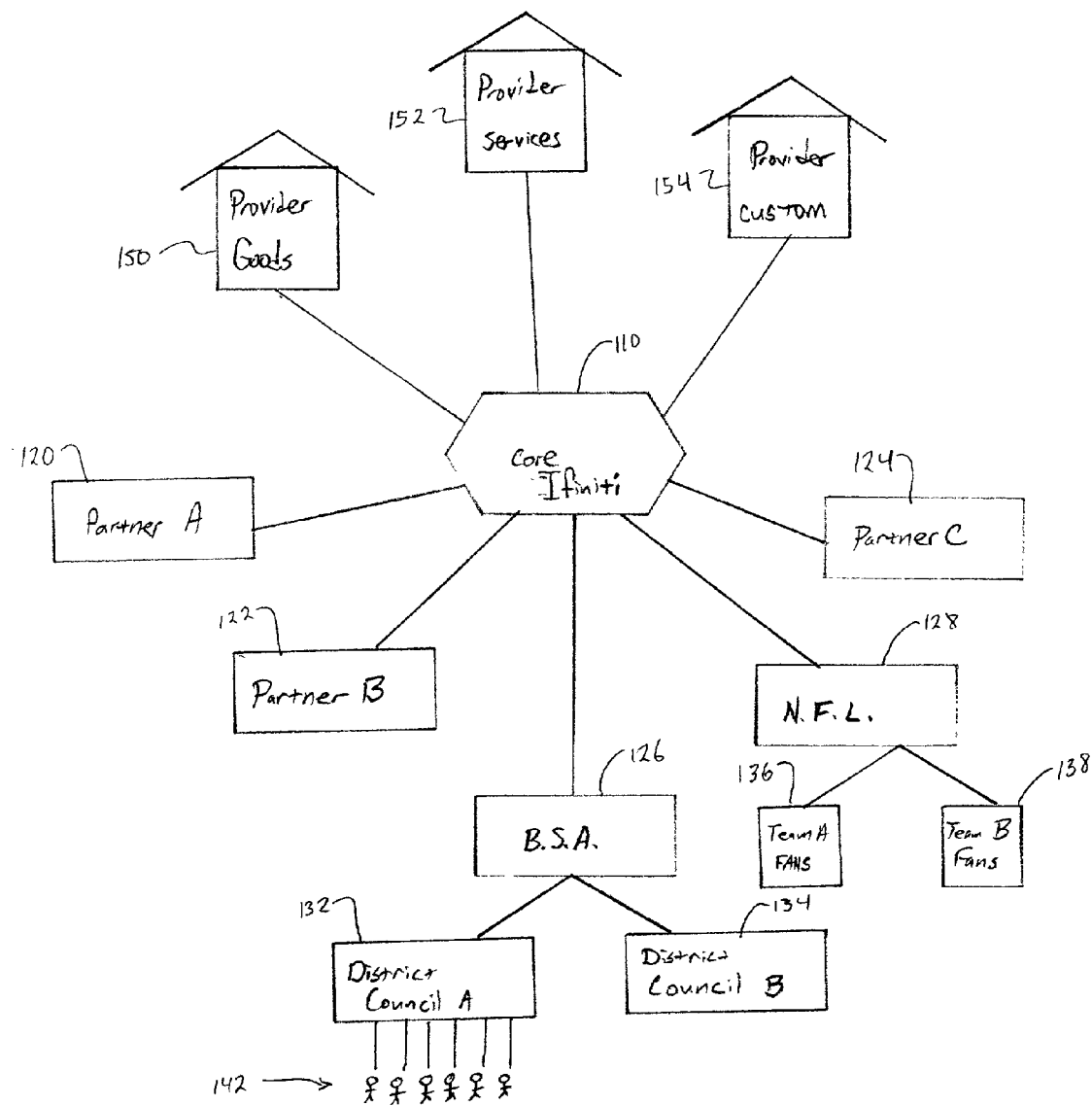
FIG. 1 illustrates an exemplary architecture for implementing the invention.

The Ifiniti business system (which may be called Ifiniti, the core business, or the invention) was designed, conceived, and created for the common good and benefit of humane, educational and charitable organizations globally. The Ifiniti business system calls for an Ifiniti organization to bear the expense of national advertising, for the Ifiniti organization to configure Affinity partner websites to link seamlessly to a common Ifiniti organization portal, and for the Ifiniti organization to provide online purchase capabilities for each and every purchase that a subscribers wishes. Over time, the achievement of these goals increases residual payments to partners of the Ifiniti organization, called Affinity partners, which also form part of the Ifiniti business system.

Accordingly, income to the Ifiniti organization may be distributed throughout the Ifiniti business system, and thus may be distributed to Affinity partners. This income is generated through subscribers' use of various products and services, preferably provided by affiliate partners. Affiliate partners pay a percentage of a purchase amount to the Ifiniti organization for distribution throughout the Ifiniti organization according to contractual arrangements made between Ifiniti and Affinity partners, and secondary partners (and optionally, lower level partners).

Interpretation Considerations

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for -functioning-" or "step for -functioning-" in the claims section.

Description of the Figures

FIG. 1 illustrates an exemplary architecture for implementing one embodiment of the invention, the Ifiniti business system 100. The business system 100 implements a core business 110, which is preferably the Ifiniti organization, and enlist a plurality of Affinity organizations as partners 120, 122, 124, 126, 128. To implement the business system 100 an order processing system is maintained by the core Ifiniti 110 for routing orders. The Ifiniti business organization 100 is enabled to receive orders for a good or a service from a member of an Affinity organization who subscribes to the Ifiniti 100.

Thus, the system can be viewed as comprising affiliate organizations 150, 152, 154, who are typically providers of goods or services for purchase (including customized goods and services), and Affinity partners 120, 122, 124, 126, 128 that have a plurality of members who can subscribe to the Ifiniti 100, and purchase products from the affiliate organizations 150, 152, 154 through the core Ifiniti 110.

Typically, the Affinity partners 120, 122, 124, 126, 128 are existing organization. These organizations have members who become called "subscribers" after they subscribe to Ifiniti. A member of an Affinity organization who makes a purchase is defined as a customer. Preferably the core Ifiniti business provides a web site which maintains the software needed to implement the Ifiniti business system (thus making the core business the business system provider). The Ifinity business system includes software that maintains, from a member perspective, the appearance of an Affinity organization. Accordingly, if a member signs on to their Affinity organization's web page, and then links into the core Ifiniti web site, then the Ifiniti web site appears to that member as a web site operated by that member's Affinity organization. In addition, the core Ifiniti web site provides a web site and/or customization tools for the core Ifiniti web site so that when a member accesses the Ifiniti web site directly, the Ifiniti web site appears to be a web site of the Affinity organization that member is affiliated with.

For example, a Boy Scouts of America™ (BSA) partner 126 may be engaged into the Ifiniti business system 100, and may engage district counsels, such as district counsel A 132 and district counsel B 134, as secondary Affinity partners. Secondary Affinity partners have full rights of participation, as described for the Affinity partners, such as stock option rights and income distribution rights, a web page, and the right to engage additional Affinity partners, such as scout troops. Accordingly, district counsel A 132 could assign its members 142 directly to the Ifiniti business system as illustrated in FIG. 1, or could enlist scout troops as Affinity partners to enlist members 142. Likewise, scout troops could enlist members, or could enlist patrols as subscribers or additional secondary Affinity partners.

Similarly, a National Football League™ (NFL)™ Affinity partner 128 could engage members directly, or could engage secondary Affinity organizations, such as Team A 136 and Team B 138, who would then engage members (fans) as subscribers. Accordingly, when a fan of Team A subscribes to Ifiniti and accesses the core Ifiniti to purchase products or services, it will appear to the fan that Team A is running the web page the member visits.

In one embodiment, a member may link to the Ifiniti organization from an Affinity partner's web site. Accordingly, the core business's web site provides a first Affinity partner web page by storing at least a web page template, customizing the template to create an Affinity partner web page, and by displaying the Affinity partner web page to that Affinity partner's members when that Affinity partner's members access the Ifiniti web site.

Figure 2:
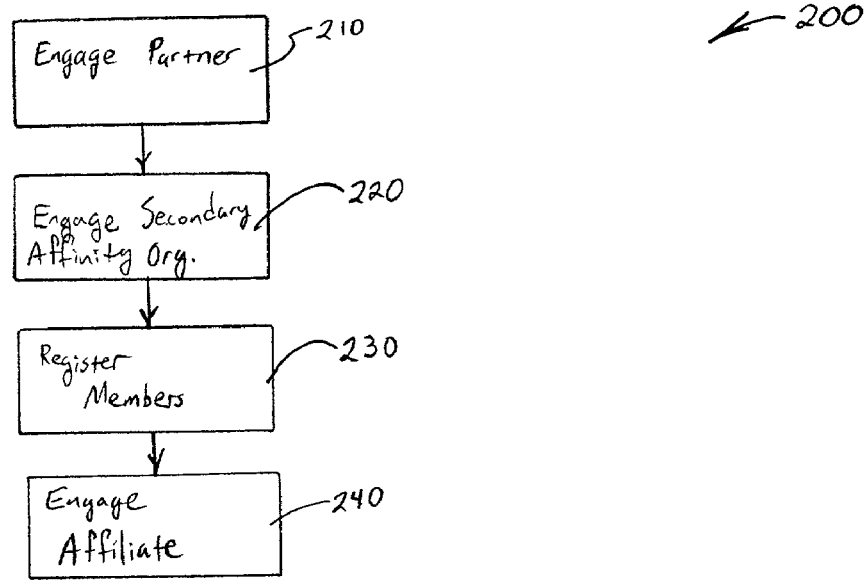
FIG. 2 is a block-flow diagram of a creation algorithm for registering members.

FIG. 2 is a block-flow diagram of a creation algorithm 200 for creating an Ifiniti business system, and for registering members as subscribers. The creation algorithm 200 begins in an engage partner act 210 wherein an Affinity partner is engaged to join the Ifiniti business system. Some incentives for joining the Infiniti business system are that the Affinity partner's members and secondary Affinity partners receive discounts for purchases made through the business system 100, and that affiliate organizations receive special promotions for their products and services that non-affiliates do not receive.

When an Affinity partner is engaged with the Ifiniti business system, the Affinity partner may wish to engage a sub-entity as a separate Affinity partner (a secondary Affinity partner) in an optional engage secondary Affinity organization act 220. The secondary Affinity partner can then enjoy all the benefits of partnership in the Ifiniti business system. Then, in a register members act 230, members of the Affinity partner and/or the secondary Affinity partner may then be registered (engaged) with Ifiniti, and thereby become subscribers. Preferably, Affinity partners, secondary Affinity partners, and members are engaged prior to engaging an affiliate organization provider to offer a product or service for purchase in an engage affiliate act 240.

Figure 3:
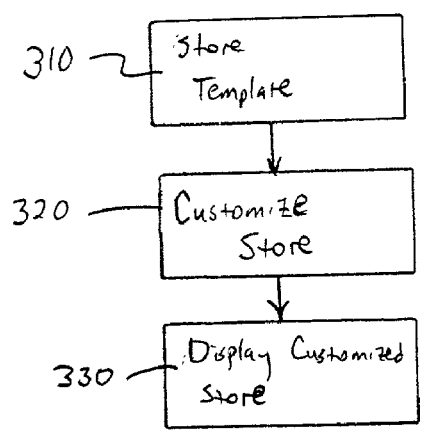
FIG. 3 is a flow chart illustrating a method for creating a customized web site.

FIG. 3 is a flow chart illustrating a web page creation algorithm 300 that may be used by the core business to create a customized web site, which may be accessed by the user directly, or preferably through a link from an Affinity partner's web site. First, in a store template act 310, the core business stores at least a first template which may be used to direct a subscriber to an affiliate organization who sells goods and services to a subscriber. Then, in a customize store act 320, the template is customized so that it will look and feel like the web site for the partner or affiliate partner to which the member belongs. Accordingly, in a display customized store act 330, a customer accesses the web site either directly or through a link from the customer's partner web site. In one embodiment, the core business uses a cookie to identify the user as a customer having an associated partner, or uses a link cookie to identify the web site from which the customer linked to the core web site.

Figure 4:
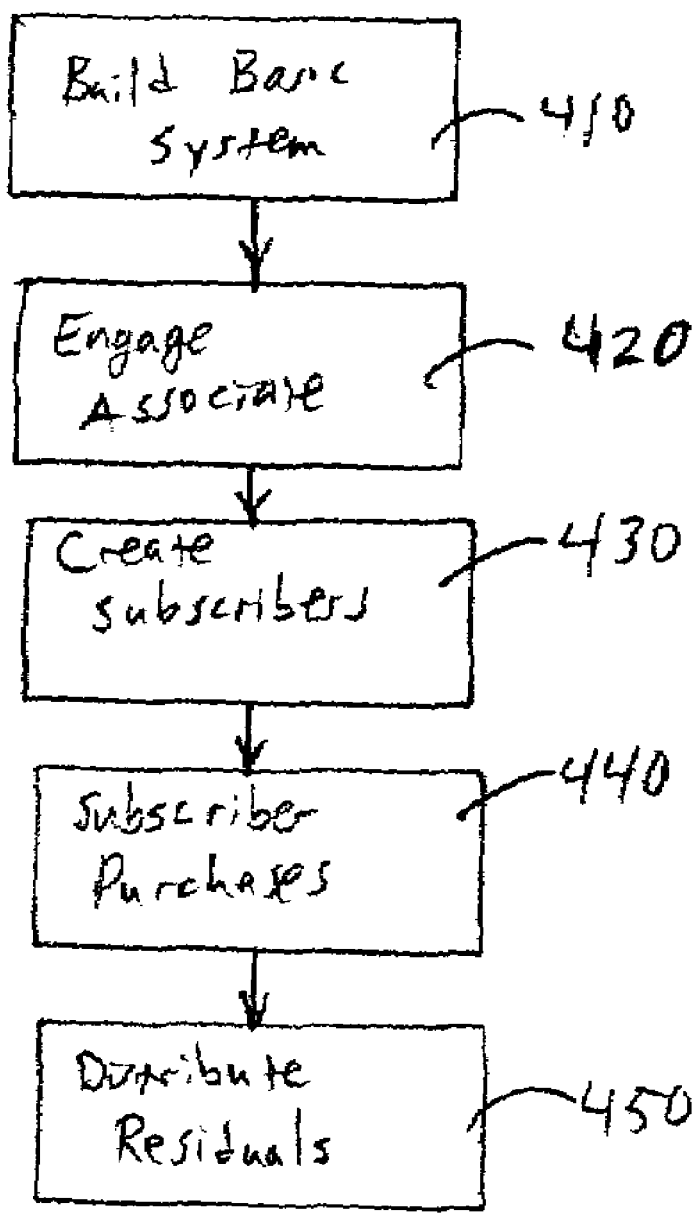
FIG. 4 shows a simplified block-flow diagram of a method of executing the Ifiniti system.

FIG. 4 shows a simplified block-flow diagram of a method of executing the Ifiniti system, illustrated as an Ifiniti algorithm 400. In an Ifiniti system, the Ifiniti algorithm 400 first builds a core business on the internet, by generally contractually enlisting Affinity partners, who may have a plurality of members, enlisting a member of the partner as a subscriber, and then by enlisting an affiliate organization provider to offer a good or service for purchase by a subscriber in a build basic system act 410. It should be noted that preferably stock options, or actual shares of stock, may be distributed to the Affinity partners and secondary Affinity partners in the build basic system act 410.

Next, in an engage associate act 420, a partner may enlist or recruit an associate organization as a secondary Affinity organization. For example, the district counsels of the BSA are associated organizations. Each Affinity partner chooses their secondary Affinity partners to participate in the residual profits paid on purchases by supporters, fans and members of the Affinity partners and secondary Affinity partners. Preferably, affiliate organization providers offer savings and "one-stop" convenience and savings via volume discounts to Ifiniti subscribers. In addition, each affiliate organization provider pays a contractually agreed upon percentage of purchases by Ifiniti subscribers (Affinity/Secondary Partners supports, fan and members) to Ifiniti on a monthly basis for distribution to Affinity partners and secondary Affinity partners.

Then, members (such as fans of a sports team, supporters, or followers of the partner or secondary/associate partner) enlist into and engage the Ifinity system as subscribers in a create subscribers act 430 (all subscribers must choose a Affinity partner when subscribing to Ifiniti).

Thus, the secondary partners' supporters, fans and members may subscribe to Ifiniti and become consumers to numerous affiliate partners by purchasing products and services. Eventually, a subscriber will purchase a product or service through the Ifiniti system in a purchase act 440. Then, preferably periodically, the Infiniti system distributes residual profits of the Ifiniti organization to the Ifiniti system Affinity partners, secondary Affinity partners, and others in a distribute residuals act 450.

Figure 5:
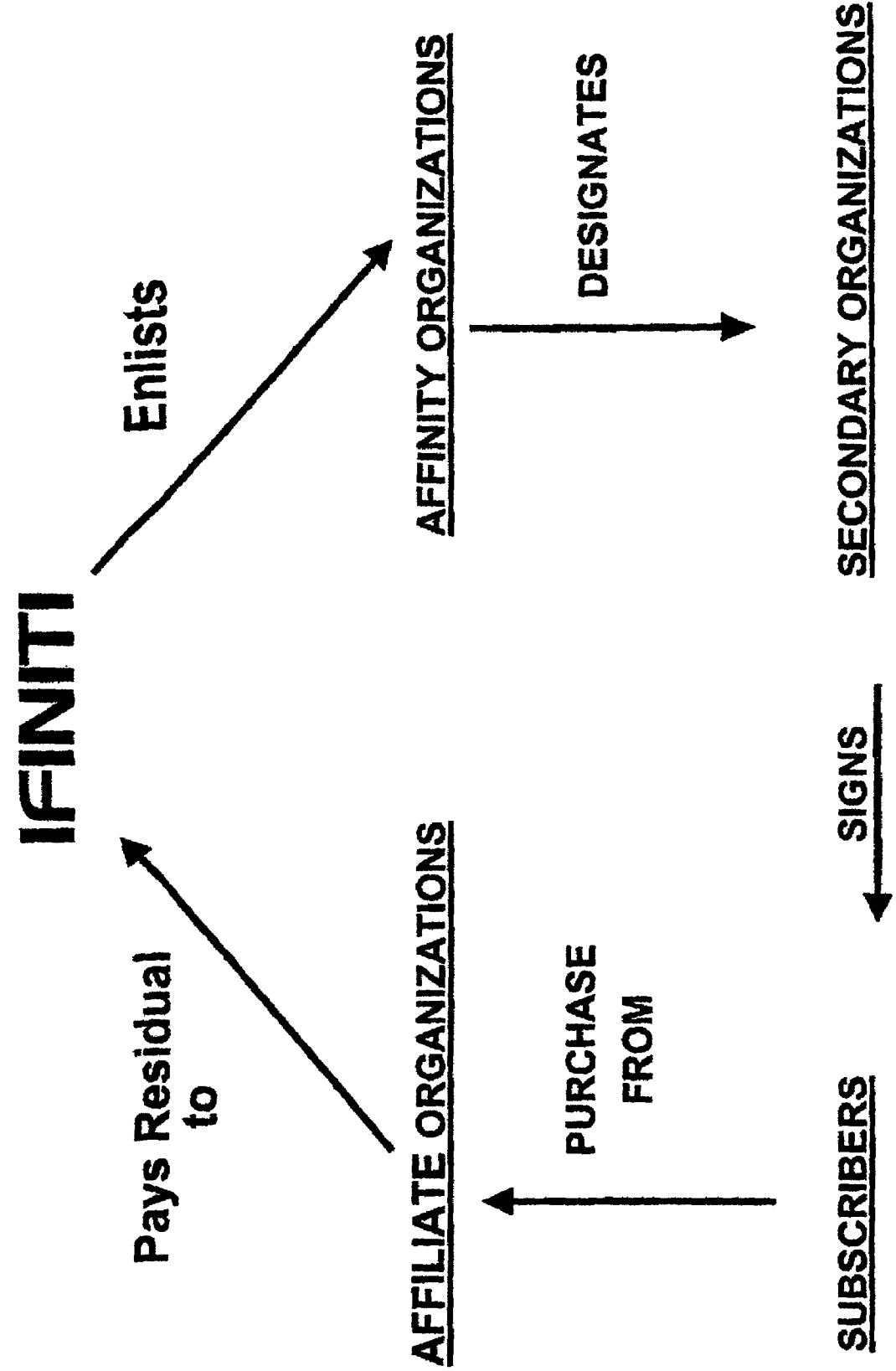
FIG. 5 is a flow chart that illustrates how the elements of the Ifiniti business system work together.

FIG. 5 is a flow chart that illustrates how the elements of the Ifiniti business system work together. In general, the Ifiniti business system begins with the Ifiniti core business, which enlists Affinity organization partners, such as the BSA or NFL, as outlined above. Then, optionally, the Affinity organization partners designate any secondary organization partners, such as district counsels and teams. Next, the members (or, persons analogous to members, such as in the case of teams, fans) sign-up with or subscribe to the Ifiniti business system, and by doing so become subscribers. Subscribers may in fact take the form of family or organizational memberships, and by becoming a subscriber, the member may make purchases from affiliate organizations.

It should be noted that the affiliate organizations may be enlisted with the Ifiniti business system at any point in time, and may become part of Ifiniti before an Affinity partner is enlisted, while enlisting an Ifiniti partner, or after an Ifiniti partner is enlisted. The making of a purchase by a subscriber from an affiliate organization results in the transfer of residual revenue from the affiliate organization to the Ifiniti organization for distribution.

Motivations to Participate for Participants in the Ifiniti Business System

Organizations want to be Affinity partners and secondary partners for stock (equity sharing), for residual income (income sharing), for free advertising and marketing, and for stock dividends, which are preferably cash. Affiliate partners enjoy free banners on Ifiniti websites, free national advertising, access to Ifiniti subscribers, high profile of association with charities, non-profit, academic and religious organizations to benefit all humanity, increased sales volume from Ifiniti subscribers, and oblique endorsements to Ifiniti subscribers by participation with Ifiniti.

Subscribers want to participate for savings on purchases, for a sense of pride from earning residual income for purchases that support their Affinity group, for free or reduced internet service (based on purchase volume), for free enrollment in daily, monthly and annual lotteries, for simplicity in purchasing decisions by participating with a single source provider of bundled services and products. Prerequisites for subscribers may include at least rewards, such as entertainment rewards, for active and long term subscribers, fanatical customer services, qualified stock options, and the convenience of one-stop/one-site for all purchases.

Features of the Ifiniti System/Benefits to Affinity Partners

One feature of the invention is equity sharing. One possible plan for equity sharing is to award Affinity organizations stock options based on the number of subscribers from that organization, and to award stock options based on the number of subscribers from secondary partners. Upwards of fifty percent of the outstanding voting stock could be owned by Affinity organizations. This has the benefit of insuring that Affinity partners will eventually substantially own and direct the corporation. Furthermore, as options are converted to stock, Affinity partners own a substantial equity position in Ifiniti.

Another feature of the Ifinity system is that the Profits of Ifiniti are divided at least three ways. They are divided between Ifiniti, the Affinity partner organizations, and secondary Affinity partner organizations. Of course, if there are third-level or other-level Affinity partners, then they will also participate in profit sharing. In traditional profit sharing plans, only a small portion of actual profit is exposed to sharing. Ifiniti allows participation in all profits.

One result of the equity sharing and profit sharing features is that they allow Ifiniti to have customers in place prior to marketing. In other words, Ifinity promotes the profit sharing and equity plans to build a network before having to promote products or services. This provides immediate, committed, loyal customers in volume. Previously, only after product(s) are ready to go to market are customers sought. Accordingly, one advantage of the Ifiniti Business System is that customers are in place before a product or services is ready for marketing. Contrast this to traditional marketing plans which attempt to generate customers after the product is ready to go to market.

Because Ifiniti subscribers can access all their shopping needs from a single site, Ifiniti offers simplicity and convenience in its purchasing structure. Because Ifiniti negotiates low prices on behalf of all its members, Ifiniti can buy in volume and negotiate low prices, which translates into savings and convenience on virtually all services and products purchased on the internet. In addition, Ifiniti pays a percentage of purchases back to the subscriber's Affinity group, which could be a charity, religious organization, or another chosen humanitarian organization. In some cases Affinity partners may be required to contribute a portion of income from Ifiniti subscribers to a charity or humanitarian organization. Internet technology and proprietary operating systems allow accurate linkage and financial accounting for purchases of untapped sources of income.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A business system, comprising:
   a business organization;
   a first Affinity partner being an existing organization having subscribers and having a customizable purchasing platform remote from the business organization;
   a plurality of affiliate organization providers remote from the first Affinity partner each enabled to identify a purchasing said subscriber, provide a good or a service for purchase to the subscriber, and provide residual to the business organization as a function of the subscriber purchases;
   wherein the business organization is enabled to receive the residual from one of the affiliate organization providers when the subscriber directly makes a purchase from the affiliate; and
   further comprising a second Affinity partner being an existing organization having subscribers remote from the business organization that is electronically associated with and is a subset of the first Affinity partner, wherein the business organization is enabled to distribute a portion of the received residual to either or both of the first Affinity partner and the second Affinity partner.

2. The business system of claim 1 wherein the business organization is enabled to distribute a portion of the received residual to the first Affinity partner and/or the second Affinity partner.

3. The business system of claim 1 wherein the customizable purchasing platform is configured such that the subscriber of the second Affinity partner can access a web site associated with the customizable purchasing platform.

4. The business system of claim 3 wherein the web site is configured such that when the subscriber of the second Affinity partner accesses the web site associated with the customizable purchasing platform, the web site appears to be a web site of the first Affinity partner or the second Affinity partner.

5. The business system of claim 1 wherein the affiliate organization providers are enabled to ship the purchased goods or services directly to the purchasing subscribers.

6. The business system of claim 1 wherein the customizable purchasing platform is enabled to electronically links the subscriber of the first Affinity partner to a web page of one of the affiliate organization providers by:
   storing a web page template;
   customizing the template to create a first Affinity partner or a second Affinity partner web page; and
   displaying the first Affinity partner or the second Affinity partner web page to the subscriber when the subscriber accesses the purchasing platform.

7. The business system of claim 1 wherein the subscriber is enabled to access an affiliate organization web page via a click-through from a web page associated with the first Affinity partner or the second Affinity partner.

8. The business system of claim 1 wherein the business organization is enabled such that funds transferred from the subscriber to the affiliate organization provider are not handled by the business organization.

9. The business system of claim 1 wherein the first Affinity partner is adapted to receive a stock option in the business organization as a function of a volume of subscribers generated by the first Affinity partner.

10. The business system of claim 1 wherein the secondary Affinity partner is adapted to receive a stock option in the business organization as a function of a volume of subscribers generated by the second Affinity partner.

11. The business system of claim 9 wherein the first Affinity partner is adapted to receives a dividend as a function of the received stock options.

12. The business system of claim 10 wherein the secondary Affinity partner is adapted to receive a dividend as a function of the received stock options.

13. The business system of claim 1 wherein a percentage of a residual income of the business organization is distributed to the first Affinity partner and secondary Affinity partners.

14. The business system of claim 1 wherein a portion of the residuals of the business organization are distributed to the first Affinity partner as a function of stock ownership in the business organization.

15. A method of building a business organization on the internet, comprising:
- enlisting a first Affinity partner being an existing organization having a plurality of subscribers to the business organization;
- enlisting at least some of the first Affinity partner subscribers to the business organization; and
- enlisting a plurality of affiliate organization providers to the business organization to offer a good or service for electronic purchase directly to the first Affinity partner subscribers without using the business organization, the affiliate organization providers distributing a residual to the business organization as a function of the purchase; and
- enlisting a secondary Affinity partner to the business organization, the secondary Affinity partner being an existing organization and a subset of the first Affinity partner, the secondary Affinity partner having a plurality of subscribers being enabled to electronically purchase a good or service directly from the affiliate organization providers without using the business organization.

16. The method of claim 15 further comprising providing a stock option of the business organization to the first Affinity partner or the second Affinity partner as a function of a volume of subscribers enlisted by the first Affinity partner or the second Affinity partner to the business organization.

17. The method of claim 15 further comprising providing a portion of the residuals of the business organization to the first Affinity partner or the second Affinity partner.

18. An electronic purchasing platform, comprising:
- a business organization;
- means enabled to allow a subscriber of a first Affinity partner being an existing organization to electronically make a purchase directly from a plurality of affiliate organization providers without using the business organization;
- means enabled to allow subscribers of a second Affinity partner being an existing organization and a subset of the first Affinity partner to purchase electronically from the plurality of affiliate organization providers;
- means enabled to provide residuals from the affiliate organization providers to the business organization as a function of the purchases; and
- means enabled to allow the first or second Affinity partner to receive a portion of the residuals from the business organization as a function of completed said purchases.

* * * * *